(12) United States Patent
Shreedharan

(10) Patent No.: US 11,526,415 B2
(45) Date of Patent: Dec. 13, 2022

(54) PROGRESSIVE ERROR HANDLING

(71) Applicant: StreamSets, Inc., San Francisco, CA (US)

(72) Inventor: Hari Shreedharan, San Jose, CA (US)

(73) Assignee: StreamSets, Inc., San Francisco, CA (US)

( * ) Notice: Subject to any disclaimer, the term of this patent is extended or adjusted under 35 U.S.C. 154(b) by 280 days.

(21) Appl. No.: 16/855,881

(22) Filed: Apr. 22, 2020

(65) Prior Publication Data

US 2021/0334189 A1 Oct. 28, 2021

(51) Int. Cl.
*G06F 11/00* (2006.01)
*G06F 11/32* (2006.01)
*G06F 9/54* (2006.01)
*G06F 11/30* (2006.01)

(52) U.S. Cl.
CPC ............ *G06F 11/327* (2013.01); *G06F 9/542* (2013.01); *G06F 9/544* (2013.01); *G06F 11/3006* (2013.01); *G06F 11/323* (2013.01)

(58) Field of Classification Search
None
See application file for complete search history.

(56) References Cited

U.S. PATENT DOCUMENTS

| | | | | |
|---|---|---|---|---|
| 6,901,496 B1 * | 5/2005 | Mukund | ................ | H04L 69/12 710/52 |
| 9,635,145 B2 * | 4/2017 | Nordmark | ............. | H04L 69/324 |
| 2004/0153494 A1 * | 8/2004 | Mukund | ............... | H04L 69/161 709/200 |
| 2004/0210610 A1 * | 10/2004 | Mukund | ................... | G06F 5/01 708/209 |
| 2005/0099841 A1 * | 5/2005 | Mukund | ............. | G06F 9/30007 712/E9.034 |
| 2005/0257062 A1 * | 11/2005 | Ignatius | .............. | G06F 21/6209 713/176 |
| 2011/0154090 A1 * | 6/2011 | Dixon | ................. | G06F 11/1658 713/502 |
| 2018/0307602 A1 * | 10/2018 | Xu | ....................... | G06F 12/0868 |
| 2018/0341553 A1 * | 11/2018 | Koudele | ................ | G11C 16/26 |

OTHER PUBLICATIONS

Google Scholar/Patents—text refined (Year: 2022).*
Google Scholar/Patents search—text refined (Year: 2022).*

* cited by examiner

*Primary Examiner* — Christopher S McCarthy

(74) *Attorney, Agent, or Firm* — Schwegman Lundberg & Woessner, P.A.

(57) ABSTRACT

Systems and methods herein describe receiving identification from a data pipeline, accessing first data offset information for a first data origin and second data offset information for a second data origin, bisecting the first data origin using the first data offset information, processing the data pipeline with the bisected first data offset information and the second data offset information, receiving a notification indicating a data pipeline status, and causing presentation of the notification on a graphical user interface of a computing device.

20 Claims, 6 Drawing Sheets

PROGRESSIVE ERROR HANDLING

TECHNICAL FIELD

Embodiments of the present disclosure generally relate to error handling. More particularly, but not by way of limitation, the present disclosure addresses systems and methods for progressive error handling.

BACKGROUND

Determining which data input or combination of data inputs cause an application to fail due to an error is a technical challenge. Most developers do not instrument their applications in a way that allows them to determine why an application failed and what data input caused it to fail.

BRIEF DESCRIPTION OF THE DRAWINGS

Some embodiments are illustrated by way of example and not limitation in the figures of the accompanying drawings. To easily identify the discussion of any particular element or act, the most significant digit or digits in a reference number refer to the figure number in which that element is first introduced.

DETAILED DESCRIPTION

Figure 1:
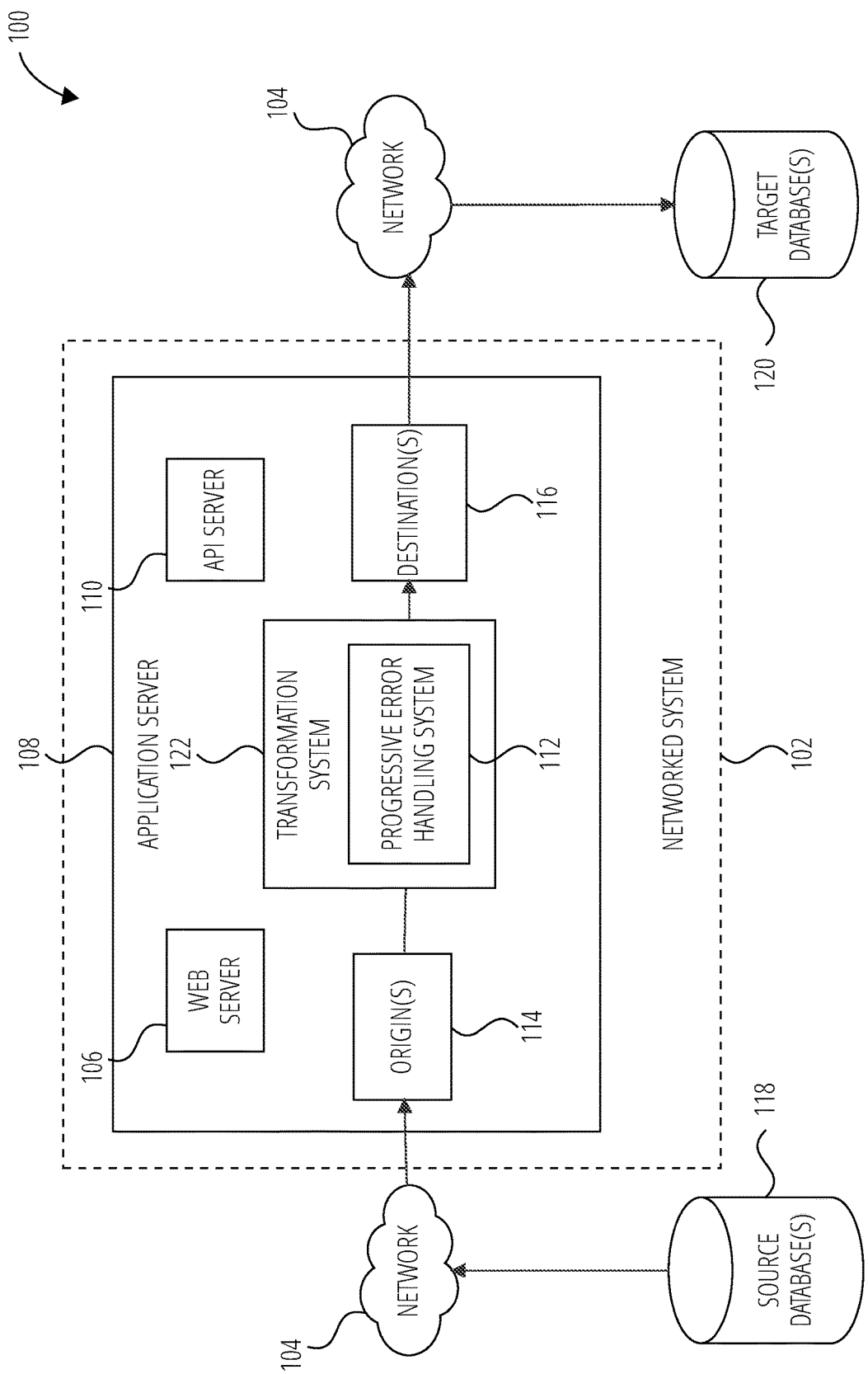
FIG. 1 is a network diagram depicting a network environment within which a progressive error handling system may be deployed, according to some embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for progressive error handling. In some embodiments, a data pipeline describes a flow of data from origin systems to destination systems and defines how to transform the data along the way. An origin is a data connecter (e.g., computer software) that can be used to access data from a data source. A destination, in contrast, writes data to a specified location. Each data pipeline may comprise two or more distinct points, also referred to as stages. Each data pipeline has an origin stage. The data in the data pipeline can be processed in multiple ways before it reaches the destination(s). As such, there are multiple processor stages to transform the data and resultant data can be written to multiple locations (e.g., destination stages).

In some embodiments, a transformation execution engine may be configured to run data pipelines on a cluster-computing framework. The data pipelines can perform transformations that require heavy processing on the entire data set. The transformation execution engine may be installed on a machine that is configured to submit computation tasks to a computer cluster (e.g., a group of interconnected computers that work together to perform computationally intensive tasks). A user may utilize a web browser to access a control interface which may be used to design and run the data pipelines. The transformation execution engine submits the data pipelines as a job to the cluster.

In some cases, the data pipeline fails, and users cannot determine why the pipeline failed or what caused the pipeline to fail. Example embodiments are directed to improving error handling in case of pipeline failure. Accordingly, in some embodiments, a progressive error handling system receives an identification from a data pipeline. For example, the identification indicates a data pipeline failure. In response to the identification of the data pipeline failure, the progressive error handling system retrieves offset information from the origins in the pipeline. The offset information includes how to restart the pipeline from where each origin left off. For example, the offset information represents a last read data from the input system(s).

Once the offset information from the origins is received, the progressive error handling system selects a first origin and bisects it. Bisecting the first origin results in bisected offset information for the bisected first origin. For example, a first origin that reads data records 1 to 100 may generate two sets of bisected offset information: 1 to 50, and 51 to 100. Subsequently, the pipeline is run again with the bisected offset information of the bisected first origin and unbisected offsets for all other origins.

In response to running (e.g., processing) the data pipeline, the progressive error handling system receives a notification indicating a data pipeline status. For example, the data pipeline status may be a complete failure or a partial failure. The progressive error handling system may cause presentation of the notification indicating a complete failure or partial failure on a graphical user interface of a computing device. If the pipeline fails on any one side of the bisect of the first origin, the progressive error handling system notifies a user of the computing device of the specific portion of the data that caused the failure.

If the pipeline fails on only one side of the bisect (e.g., partial failure) of the first origin, the progressive error handling system continues to bisect the failed bisect of the first origin until the data pipeline fails on both sides of the bisect. If the data pipeline fails on both sides of the bisect (e.g., complete failure) of the first origin, the progressive error handling system proceeds to bisect the next origin but retains the bisected offset information for the first origin that caused the data pipeline failure.

Once the progressive error handling system has completed analysis failure on one specific origin, the system uses the bisected information of that origin that caused the failure and repeats the process until all origins fail on both sides of a bisect. Thus, if an origin fails on both sides of a bisect, the progressive error handling system stops bisecting that origin and starts bisecting the next origin while retaining the offsets for other previously bisected origins at the position where the bisect failed on both sides.

In some embodiments, in response to a data pipeline failure on both sides of a bisect, the progressive error handling system causes presentation of an indication representing which portions of the data caused the error. For example, the indication may represent which combination of data from all the origins caused the data pipeline failure. The indication may be presented within a graphical user interface of the computing device.

FIG. 1 is a diagram illustrating a network environment 100 suitable for progressive error handling, in accordance with example embodiments. The network environment 100 includes a network system 102 communicatively coupled via a network 104 to databases. In example embodiments, the network system 102 comprises components that perform progressive error handling. The components of the network system 102 are described in more detail in connection with FIG. 2 and may be implemented in a computer system, as described below with respect to FIG. 6.

In some embodiments, the described progressive error handling system 112 may be used for error detection and identification. For example, the progressive error handling system 112 may help users identify what stage caused a data pipeline failure and what data inputs from the data origin(s) (e.g., source database(s) 118) triggered the failure.

FIG. 1 illustrates, for example, a data pipeline with origin(s) 114 and destination(s) 116 and a transformation system 122. The origin(s) 114 may be configured to connect to source database(s) 118 via the network 104. The transformation system 122 receives data from the origin(s) 114 and performs one or more transformation operations on the data. The transformation system 122 submits the transformed data to the destination(s) 116. In example embodiments, the transformation system 122 includes a progressive error handling system 112. The progressive error handling system 112 is configured to identify what stage in the data pipeline caused a failure and what data inputs from the origin(s) 114 triggered the failure.

A networked system 102 provides server-side functionality via a network 104 (e.g., the Internet or Wide Area Network (WAN)) to one or more data storage systems. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

An Application Program Interface (API) server 110 and a web server 106 are coupled to, and provide programmatic and web interfaces respectively to, an application server 108. The application server 108 hosts the transformation system 122. The transformation system 122 may thus facilitate data transformations and perform error handling tasks using the progressive error handling system 112. The application server 108 is, in turn, may be coupled to a database server that facilitates access to source database(s) 118 and target database(s) 120.

While the transformation system 122 is shown in FIG. 1 to form part of the networked system 102, it will be appreciated that, in alternative embodiments, the transformation system 122 may form part of a service that is separate and distinct from the networked system 102. Similarly, while the progressive error handling system 112 is shown to form part of the networked system 102, it will be appreciated that, in alternative embodiments, the progressive error handling system 112 may form part of a service that is separate and distinct from the networked system 102.

Further, the network environment 100 is, of course, not limited to such an architecture as shown in FIG. 1 and could equally well find application in a distributed or peer-to-peer architecture system, for example. Any portion, or portions, of the transformation system 122 and the progressive error handling system 112 may reside and be executed from any kind of computing device. The transformation system 122 and the progressive error handling system 112 can also be implemented as standalone software program(s), which does not necessarily have networking capabilities.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 2:
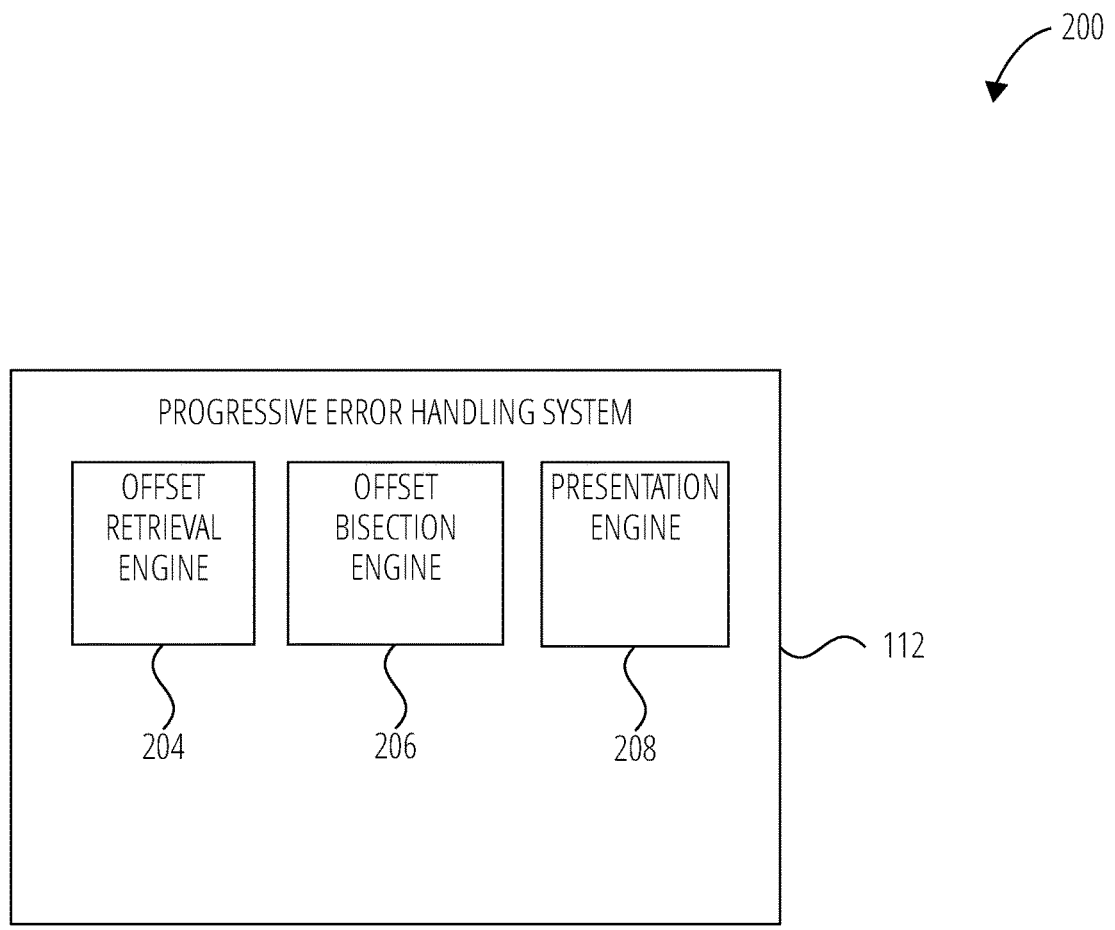
FIG. 2 is a block diagram showing components of a progressive error handling system, according to some example embodiments.

FIG. 2 is a block diagram showing components of the progressive error handling system 112, according to some example embodiments. The progressive error handling system 112 is configured to detect and identify errors. To enable these operations, the progressive handling system comprises an offset retrieval engine 206, an offset bisection engine 208, and a presentation engine 210.

The offset retrieval engine 206 retrieves offsets from the origin(s) 114. The transformation system 122 reads a batch of data from the origin(s) 114 and transforms the data via processors. The transformation system 122 then writes the transformed data to the destination(s) 116. The transformation system 122 also writes metadata known as an offset, to a permanent storage system (e.g., any computer data storage device that retains its data when the device is unpowered). For example, each time a batch of data is read, processed, and written, the transformation system 122 keeps track of the data that has been processed by storing an offset. The offset enables the transformation system 122 to keep track of the data that has been processed. The offset comprises information such as how to restart the data pipeline from where each origin last left off. The information generally includes a start string, an end string, and a count. Each of the origin(s) 114 is able to parse its own start and end strings to determine how to restart the data pipeline from where it left off. The origin 114 is thus informed of a last batch of data that it sent, allowing the data pipeline to proceed from that point. Thus, the offset information is used to restart the data pipeline after it is stopped (e.g., due to a data pipeline failure).

The offset bisection engine 208 bisects offset information retrieved by the offset retrieval engine 206 and generates bisected offset information. For example, an origin that reads data records 1 to 100 may produce an offset represented by (start string=1, count–100, end string=100). The offset bisection engine 208 uses that offset information to generate two sets of bisected offset information: (start string=1, count=50, end string=50) and (start string=51, count=50, end string=100).

The presentation engine 210 is responsible for causing presentation of information produced by the progressive error handling system 112 to a graphical user interface of a computing device. For example, the progressive error handling system 112 may use the presentation engine 210 to cause presentation of a notification indicating a data pipeline status (e.g., a complete failure or a partial failure). The presentation engine 210 may also be used to cause presentation of an indication of which data from the origin(s) 114 caused a data pipeline failure. In one embodiment, the causing presentation comprises generating instructions for rendering a user interface that displays information. The instructions are then transmitted to the computing device.

Figure 3:
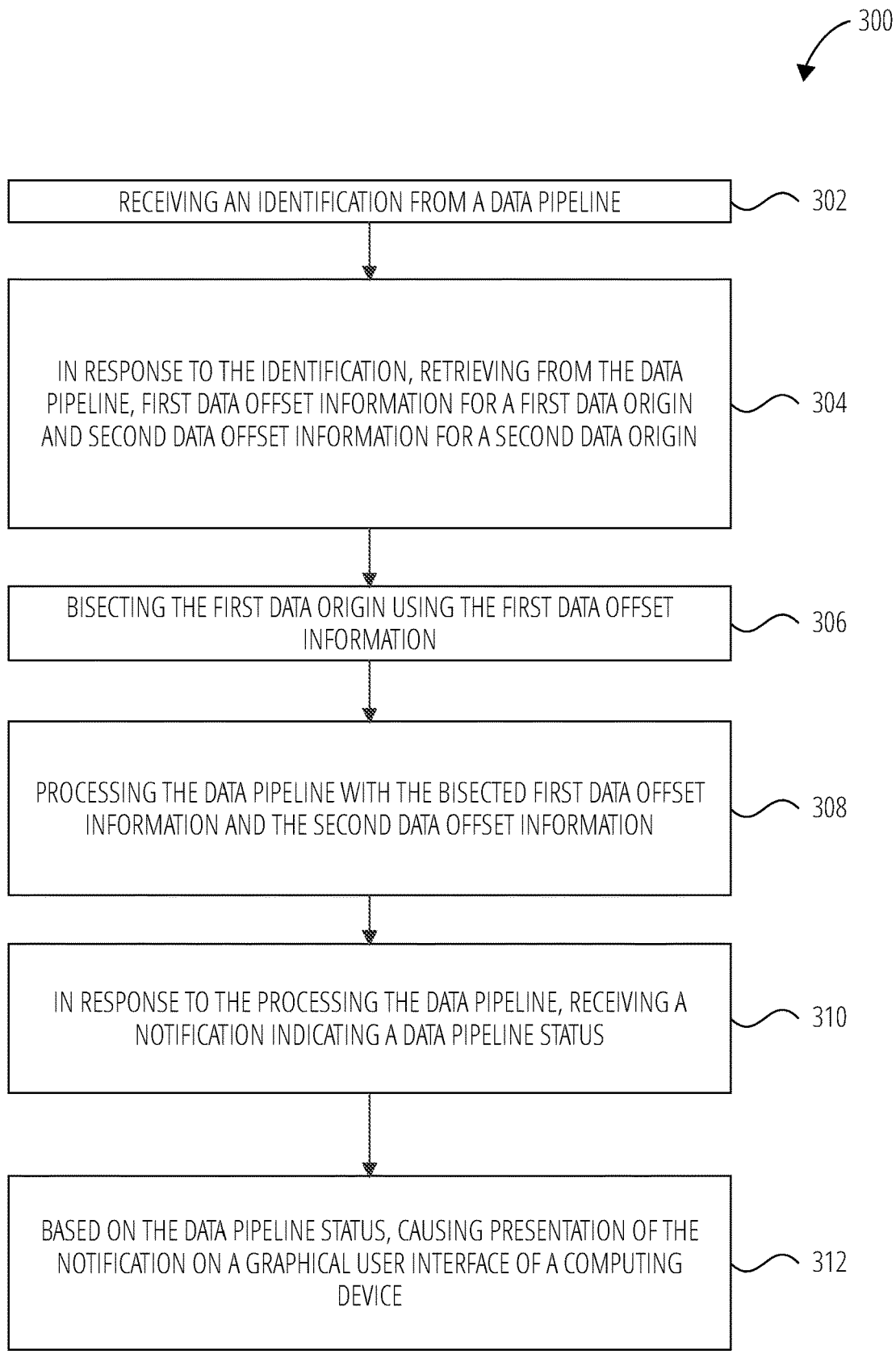
FIG. 3 is a flowchart of a method for progressive error handling, according to some example embodiments.

FIG. 3 is a flowchart of an example method 300 for progressive error handling, according to some example embodiments. Operations in the method 300 are performed by the networked system 102, using components described above with respect to FIG. 1 and FIG. 2 Accordingly, the method 300 is described by way of example with reference to the networked system 102. However, it shall be appreciated that at least some of the operations of the method 300 may be deployed on various other hardware configurations or be performed by similar components residing elsewhere in the network environment 100. Therefore, the method 300 is not intended to be limited to the networked system 102.

In operation 302, the progressive error handling system 112 receives an identification from a data pipeline. In some examples, the identification represents a data pipeline failure. The identification may be received from a computer cluster running a cluster-computing framework.

In operation 304, in response to receiving the identification, the progressive error handling system 112 accesses, from the data pipeline, first data offset information for a first data origin and second data offset information for a second data origin from a database. The offset information may be accessed by the offset retrieval engine 206. The first data origin may represent a first data source and the second data origin may represent a second data source.

At operation 306, the progressive error handling system 112 bisects the first data origin using the first data offset information. In example embodiments, the bisecting includes generating bisected first data offset information. Bisecting the first data origin is performed by the offset bisection engine 208. In some embodiments, the offset bisection engine 208 verifies that the first data origin supports bisecting before bisecting the first data origin.

At operation 308, the progressive error handling system 112 processes the data pipeline with the bisected first data offset information and the second data offset information. For example, the progressive error handling system 112 runs the data pipeline with the bisected first data offset information and the unbisected second data offset information.

At operation 310, in response to processing the data pipeline, the progressive error handling system 112 receives a notification indicating a data pipeline status. For example, the data pipeline status may be a complete failure or a partial failure.

Based on the data pipeline status, the progressive error handling system 112, at operation 312, causes presentation of the notification on a graphical user interface of a computing device. In some examples, the presentation engine 210 causes presentation of the notification. For example, the user of the computing device may be shown a user interface indicating that the data pipeline has succeeded or failed.

In some embodiments, the progressive error handling system 112 generates an indication of data from the first data origin that caused the failure. For example, the indication may distinctly point out which data inputs from the first data origin caused the data pipeline to fail. The progressive error handling system 112 uses the first data offset information to identify which row or rows of data (e.g., within a spreadsheet or a database table communicatively coupled to the origin(s) 114) caused the failure. For example, if the bisected first data offset information fails on: (start string=1, count=50, end string=50) and (start string=51, count=50, end string=100), then the progressive error handling system 112 identifies that the data between: (start string=1, count=100, end string=100) in the first data origin caused the failure. The progressive error handling system 112 may cause presentation of the indication on the graphical user interface of the computing device. For example, the user may be shown a user interface that shows a synopsis of the error and the start and end offsets at the time of failure. Thus, the user is able to view the exact data inputs that caused the data pipeline failure.

Figure 4:
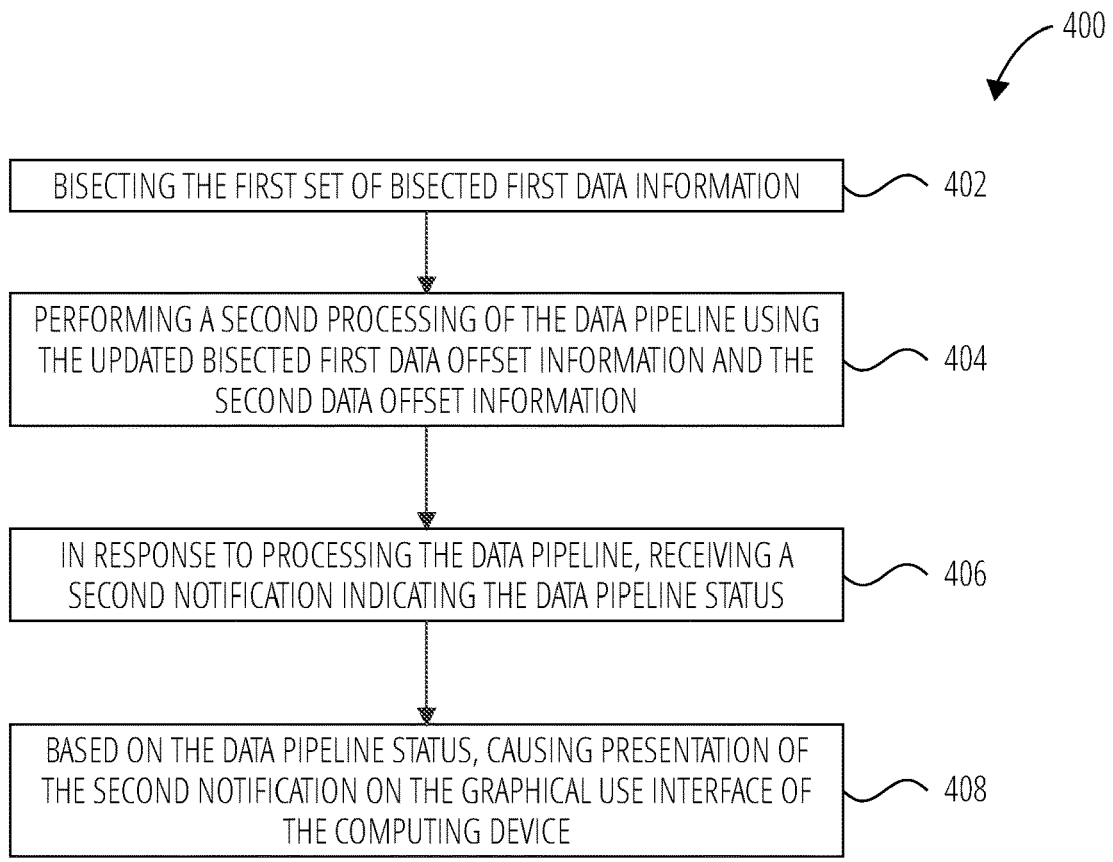
FIG. 4 is a flowchart of a method for progressive error handling for a partial failure, according to some example embodiments.

FIG. 4 is an example method 400 for progressive error handling when the method 300 results in a partial failure, according to some example embodiments. Operations in the method 400 are performed by the networked system 102 after operation 312, using components described above with respect to FIG. 1 and FIG. 2. In some embodiments, operations in the method 400 are performed by the networked system 102 after operation 310, using components described above with respect to FIG. 1 and FIG. 2. Accordingly, the method 400 is described by way of example with reference to the networked system 102. However, it shall be appreciated that at least some of the operations of the method 400 may be deployed on various other hardware configurations or be performed by similar components residing elsewhere in the network environment 100. Therefore, the method 400 is not intended to be limited to the networked system 102.

In some examples if the data pipeline status received at operation 310 is a partial failure, then the progressive error handling system 112 bisects the bisected first offset information set that caused the failure. For example, consider the two sets of the bisected first offset information:

Set 1: (start string=1,count=50,end string=50)

Set 2: (start string=51,count=50,end string=100)

Assume Set 1 fails during the data pipeline processing but Set 2 does not fail. In that case, the progressive error handling system 112 will return a partial failure in operation 310. In response to the partial failure, at operation 402, the progressive error handling system 112 bisects the failed bisected first offset information set (e.g., Set 1). For example, the progressive error handling system generates updated bisected first offset information:

Set 1A: (start string=1,count=25,end string=25)

Set 1B: (start string=26,count=25,end string=50)

At operation 404, the progressive error handling system 112 performs a second processing of the data pipeline with the updated bisected first offset information and the original, unbisected offset information for the second data origin.

At operation 406, in response to the second processing of the data pipeline, the progressive error handling system 112 receives a second notification indicating the data pipeline status. At operation 408, based on the data pipeline status, the progressive error handling system causes presentation of the second notification on the graphical user interface of the computing device. For example, the presentation engine 210 causes presentation of the second notification.

If the progressive error handling system 112 receives a notification indicating a partial failure the progressive error handling system proceeds to bisect the updated bisected first offset information. If bisecting the first data origin no longer provides the progressive error handling system 112 with any further information (e.g., the data pipeline does not fail on both sides of the bisect or the first data origin is no longer able to be bisected any further), the progressive error handling system 112 uses the last failed bisected first offset information and proceeds to bisect the second origin. For example, if Set 1A failed and Set 1B did not fail but the progressive error handling system 112 cannot bisect Set 1A further, the progressive error handling system 112 retains the offset information included in Set 1A for the first data origin and proceeds to bisect the second data origin. The progressive error handling system 112 continues to bisect another origin (e.g., the second data origin) and process the data pipeline until all origins fail on both sides of a bisect.

In some embodiments, the progressive error handling system 112 generates an indication of data from the first data origin and data from the second data origin that caused the failure. The progressive error handling system 112 causes presentation of the indication on the graphical user interface of the computing device in operation 412. Thus, a user may view the combination of data from the first data origin and the second data origin that caused the failure on the graphical user interface.

Figure 5:
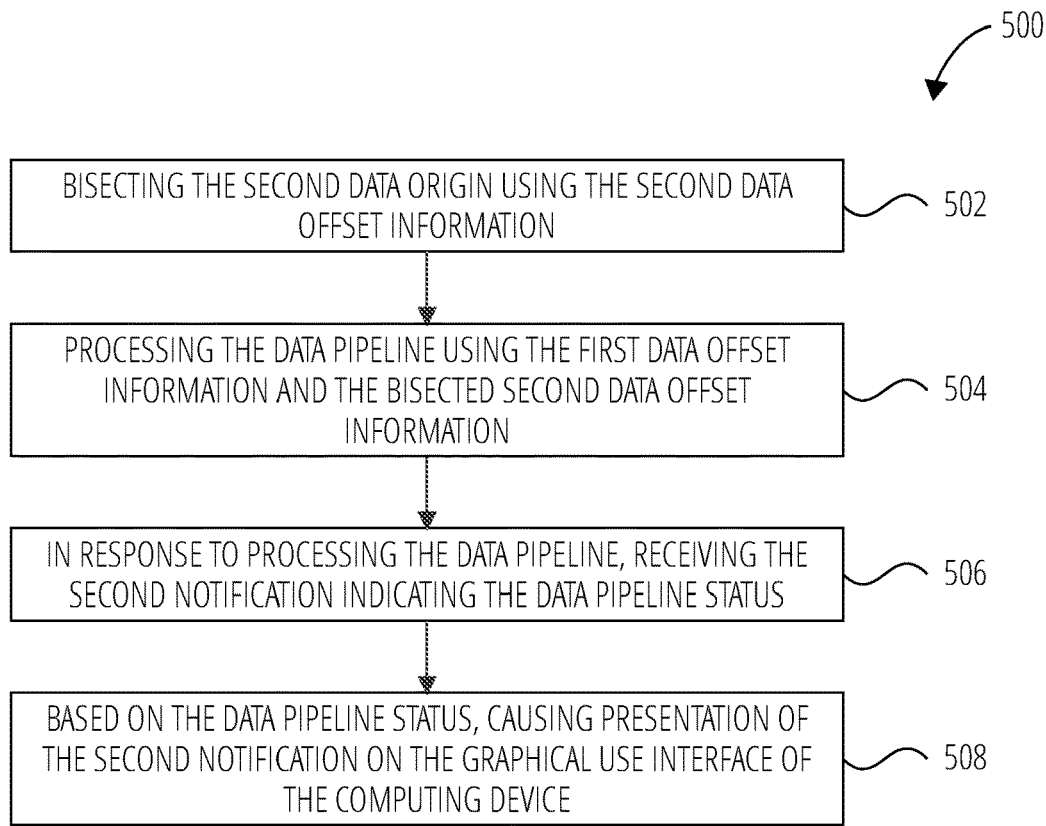
FIG. 5 is a flowchart of a method for progressive error handling for a complete failure, according to some example embodiments.

FIG. 5 is an alternative method 500 for progressive error handling when the method 300 results in a complete failure, according to some example embodiments. Operations in the method 500 are performed by the networked system 102 after operation 312, using components described above with respect to FIG. 1 and FIG. 2. In some embodiments, operations in the method 500 are performed by the networked system 102 after operation 310, using components described above with respect to FIG. 1 and FIG. 2. Accordingly, the method 500 is described by way of example with reference to the networked system 102. However, it shall be appreciated that at least some of the operations of the method 500 may be deployed on various other hardware configurations or be performed by similar components residing elsewhere in the network environment 100. Therefore, the method 500 is not intended to be limited to the networked system 102.

In some embodiments, if the data pipeline status received at operation 310 is a complete failure, then the progressive error handling system 112 selects another origin to bisect and repeats the process.

For example, assume the progressive error handling system 112 produced the following bisected first data offset information:

Set A: (start string=1,count=50,end string=50)

Set B: (start string=51,count=50,end string=100)

Assume that the first data origin failed on both sides of the bisect (e.g., Set A and Set B failed). In that case, the progressive error handling system 112 cannot retrieve any further information from the first origin and proceeds to bisect the second origin.

For example, at operation 502, the progressive error handling system 112 bisects the second data origin using the second data offset information, the bisecting including generating bisected second data offset information. The offset bisection engine 208 may bisect the second data origin.

In operation 504, the progressive error handling system 112 performs a second processing of the data pipeline with the original first data offset information and the bisected second data offset information.

At operation 506, in response to processing the data pipeline, the progressive error handling system 112, receives a notification indicating the data pipeline status. At operation 508, based on the data pipeline status, the progressive error handling system 112 causes presentation of the notification on the graphical user interface of the computing device. For example, the presentation engine 210 causes presentation of the notification.

In some embodiments, the progressive error handling system 112 generates an indication of data from the first data origin and data from the second data origin that caused the failure. The progressive error handling system 112 causes presentation of the indication on the graphical user interface of the computing device. Thus, a user may view the combination of data from the first data origin and the second data origin that caused the failure on the graphical user interface.

Figure 6:
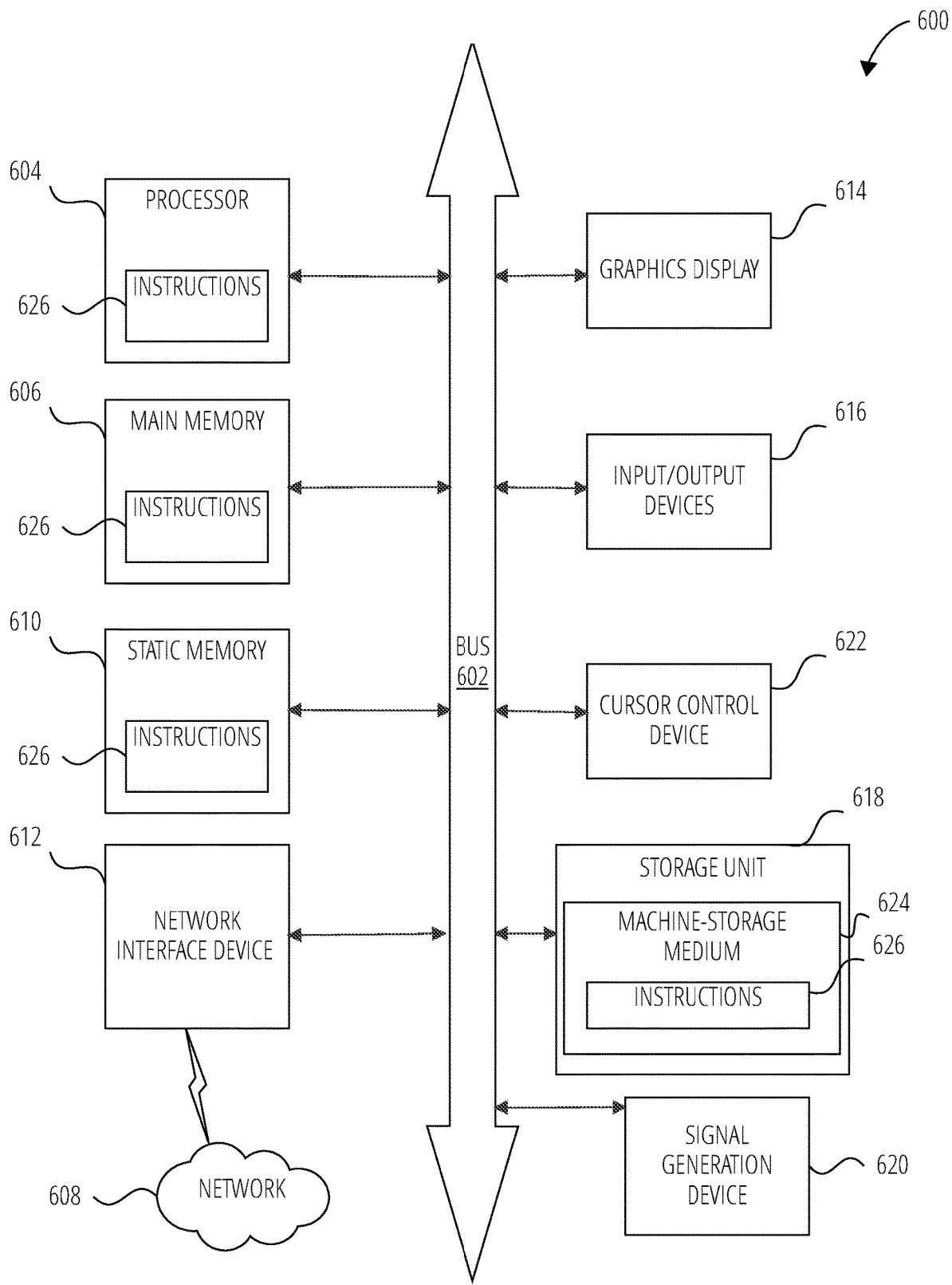
FIG. 6 shows a diagrammatic representation of a machine in the example form of a computer system within which a set of instructions, for causing the machine to perform any one or more of the methodologies discussed herein, may be executed, according to some example embodiments.

FIG. 6 illustrates components of a machine 600, according to some example embodiments, that is able to read instructions from a machine-storage medium (e.g., a machine-readable storage device, a non-transitory machine-readable storage medium, a computer-readable storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 626 (e.g., software, a program, an application, an applet, an app, or other executable code) for causing the machine 600 to perform any one or more of the methodologies discussed herein may be executed, in whole or in part.

For example, the instructions 626 may cause the machine 600 to execute the flow diagrams of FIG. 3 In one embodiment, the instructions 626 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 626 (sequentially or otherwise) that specify actions to be taken by that machine. Further, while only a single machine is illustrated, the term "machine" shall also be taken to include a collection of machines that individually or jointly execute the instructions 626 to perform any one or more of the methodologies discussed herein.

The machine 600 includes a processor 604 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 606, and a static memory 610, which are configured to communicate with each other via a bus 602. The processor 604 may contain microcircuits that are configurable, temporarily or permanently, by some or all of the instructions 626 such that the processor 604 is configurable to perform any one or more of the methodologies described herein, in whole or in part. For example, a set of one or more microcircuits of the processor 604 may be configurable to execute one or more modules (e.g., software modules) described herein.

The machine 600 may further include a graphics display 614 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 516 (e.g., a keyboard), a cursor control device 622 (e.g., a mouse, a touchpad, a trackball, a joystick, a motion sensor, or other pointing instrument), a storage unit 618, a signal generation device 620 (e.g., a sound card, an amplifier, a speaker, a headphone jack, or any suitable combination thereof), and a network interface device 612.

The storage unit 618 includes a machine-storage medium 524 (e.g., a tangible machine-readable storage medium) on which is stored the instructions 626 (e.g., software) embodying any one or more of the methodologies or functions described herein. The instructions 626 may also reside, completely or at least partially, within the main memory 606, within the processor 604 (e.g., within the processor's cache memory), or both, before or during execution thereof by the machine 600. Accordingly, the main memory 606 and the processor 604 may be considered as machine-readable media (e.g., tangible and non-transitory machine-readable media). The instructions 626 may be transmitted or received over a network 608 via the network interface device 720.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 506, 510, and/or memory of the processor 604) and/or storage unit 618 may store one or more sets of instructions and data structures (e.g., software) embodying or utilized by any one or more of the methodologies or functions described herein. These instructions, when executed by processor(s) 504 cause various operations to implement the disclosed embodiments.

As used herein, the terms "machine-storage medium," "device-storage medium," "computer-storage medium" (referred to collectively as "machine-storage medium 524") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 524 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 524 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 626 may further be transmitted or received over a communications network 726 using a transmission medium via the network interface device 612 and utilizing any one of a number of well-known transfer protocols (e.g., HTTP). Examples of communication networks 508 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 626 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving, using one or more processors, an identification from a data pipeline;
in response to receiving the identification; accessing from the data pipeline, first data offset information for a first data origin and second data offset information for a second data origin;
bisecting the first data origin using the first data offset information, the bisecting including generating bisected first data offset information;
processing the data pipeline with the bisected first data offset information and the second data offset information;
in response to the processing the data pipeline, receiving a notification indicating a data pipeline status; and
based on the data pipeline status, causing presentation of the notification on a graphical user interface of a computing device.

2. The method of claim 1, wherein the identification of the data pipeline indicates a data pipeline failure.

3. The method of claim 1, wherein the first data offset information represents data from the first data origin that was most recently processed by the data pipeline, the method further comprising:
storing the first offset information in a permanent storage system.

4. The method of claim 1, wherein the bisected first data offset information comprises a first set of bisected first data offset information and a second set of bisected first data offset information.

5. The method of claim 4, wherein the data pipeline status is a partial failure, the method further comprising:
bisecting the first set of bisected first data information, the bisecting including generated updated bisected first data offset information; and
performing a second processing of the data pipeline using the updated bisected first data offset information and the second data offset information.

6. The method of claim 5, further comprising:
in response to the second processing the data pipeline, receiving a second notification indicating the data pipeline status; and
based on the data pipeline status, causing presentation of the second notification on a graphical user interface of a computing device.

7. The method of claim 4, wherein the data pipeline status is a complete failure, the method further comprising:
bisecting the second data origin using the second data offset information, the bisecting including generating bisected second data offset information; and
performing a second processing of the data pipeline using the first data offset information and the bisected second data offset information.

8. The method of claim 7, further comprising:
in response to the second processing the data pipeline, receiving a second notification indicating the data pipeline status; and
based on the data pipeline status, causing presentation of the second notification on a graphical user interface of a computing device.

9. The method of claim 1 further comprising:
generating an indication of data from the first data origin that caused the failure; and
causing presentation of the indication on the graphical user interface of the computing device.

10. A computing apparatus comprising:
a processor; and
a memory storing instructions that, when executed by the processor, configure the apparatus to perform operations comprising:

receiving, using one or more processors, an identification from a data pipeline;

in response to receiving the identification, accessing from the data pipeline, first data offset information for a first data origin and second data offset information for a second data origin;

bisecting the first data origin using the first data offset information, the bisecting including generating bisected first data offset information;

processing the data pipeline with the bisected first data offset information and the second data offset information;

in response to the processing the data pipeline, receiving a notification indicating a data pipeline status; and based on the data pipeline status, causing presentation of the notification on a graphical user interface of a computing device.

11. The computing apparatus of claim 10, wherein the identification of the data pipeline indicates a data pipeline failure.

12. The computing apparatus of claim 10, wherein the first data offset information represents data from the first data origin that was most recently processed by the data pipeline, the operations further comprising:

storing the first offset information in a permanent storage system.

13. The computing apparatus of claim 10, wherein the bisected first data offset information comprises a first set of bisected first data offset information and a second set of bisected first data offset information.

14. The computing apparatus of claim 13, wherein the data pipeline status is a partial failure, the operations further comprising:

bisecting the first set of bisected first data information, the bisecting including generated updated bisected first data offset information; and performing a second processing of the data pipeline using the updated bisected first data offset information and the second data offset information.

15. The computing apparatus of claim 14, the operations further comprising:

in response to the second processing the data pipeline, receiving a second notification indicating the data pipeline status; and based on the data pipeline status, causing presentation of the second notification on a graphical user interface of a computing device.

16. The computing apparatus of claim 13, wherein the data pipeline status is a complete failure, the operations further comprising:

bisecting the second data origin using the second data offset information, the bisecting including generating bisected second data offset information; and performing a second processing of the data pipeline using the first data offset information and the bisected second data offset information.

17. The computing apparatus of claim 16, the operations further comprising:

generating an indication of data from the first data origin that caused the failure; and causing presentation of the indication on the graphical user interface of the computing device.

18. The computing apparatus of claim 10, wherein the first data origin is a first data source and the second data origin is a second data source.

19. A non-transitory computer-storage medium storing instructions that, when executed by one or more processors of a machine, cause the machine to perform operations comprising:

receiving, using one or more processors, an identification from a data pipeline;

in response to receiving the identification, accessing from the data pipeline, first data offset information for a first data origin and second data offset information for a second data origin;

bisecting the first data origin using the first data offset information, the bisecting including generating bisected first data offset information;

processing the data pipeline with the bisected first data offset information and the second data offset information;

in response to the processing the data pipeline, receiving a notification indicating a data pipeline status; and based on the data pipeline status, causing presentation of the notification on a graphical user interface of a computing device.

20. The non-transitory computer storage medium of claim 19, wherein the identification of the data pipeline indicates a data pipeline failure.

* * * * *